3,583,033
VALVING DIE FOR IN-LINE EXTRUSION OF THERMOPLASTIC MATERIAL
Alkis Christofas, Philadelphia, and Andrew Anthony Dukert, Ambler, Pa., assignors to Pennsalt Chemicals Corporation, Philadelphia, Pa.
Filed Jan. 22, 1969, Ser. No. 793,105
Int. Cl. B29d 23/04; B29f 3/04, 3/08
U.S. Cl. 18—14V
9 Claims

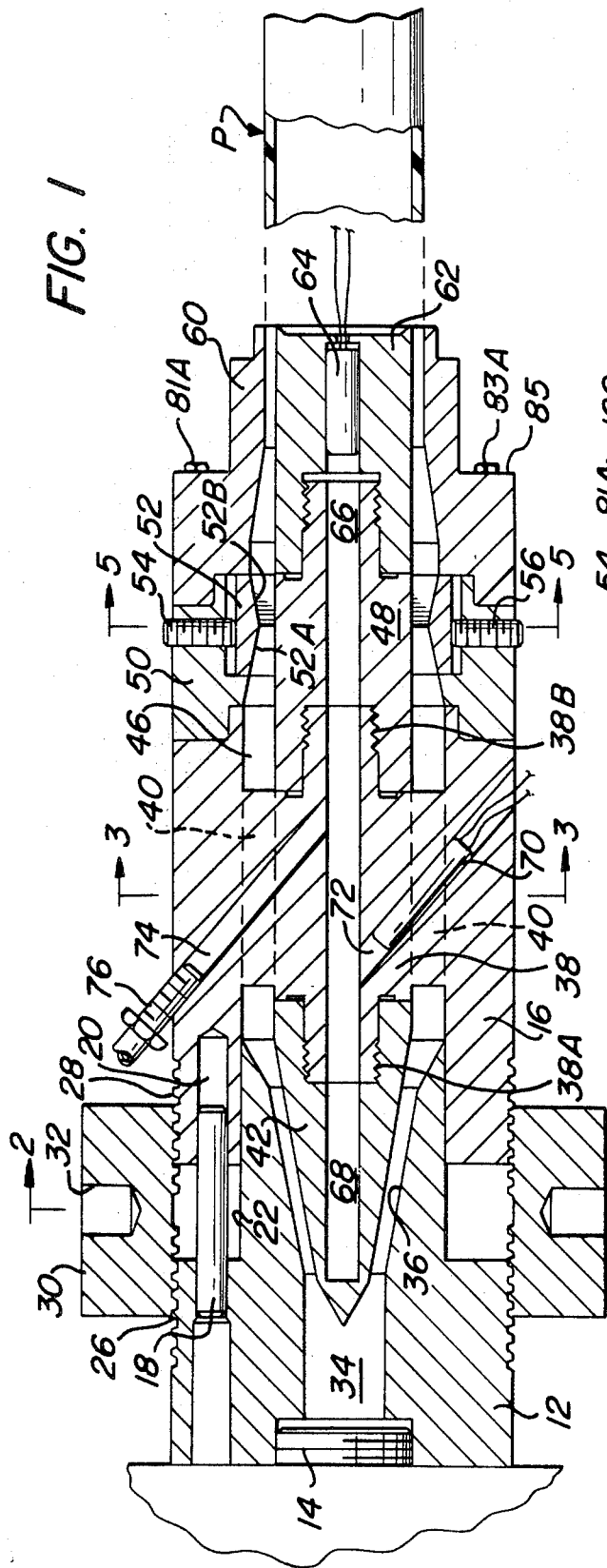
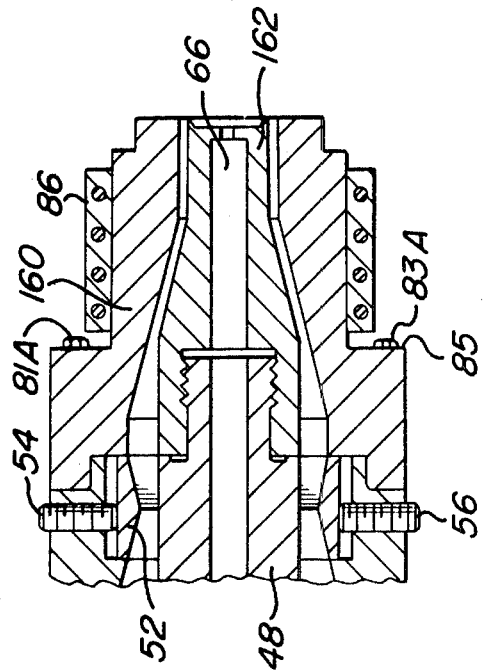

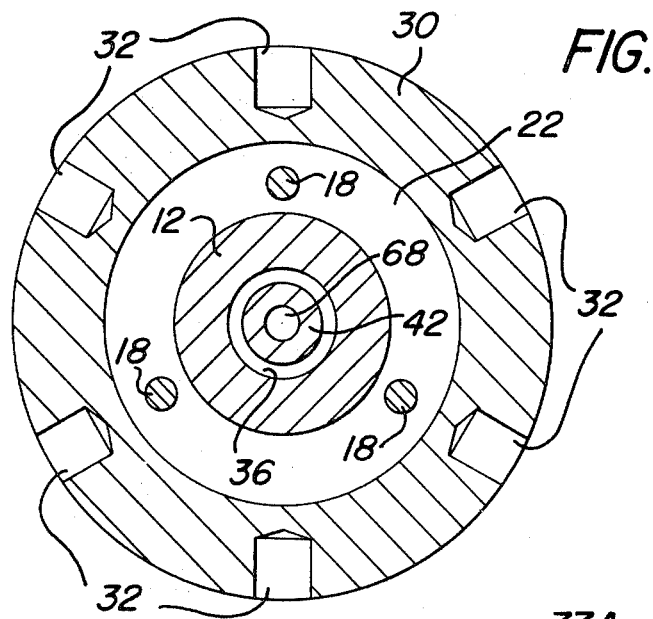
FIG. 2
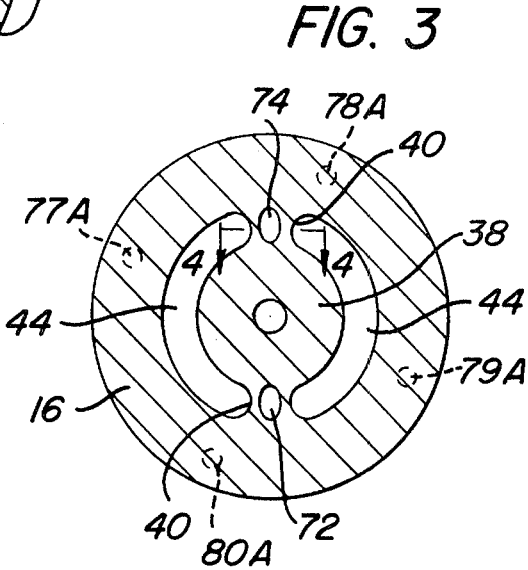
FIG. 3
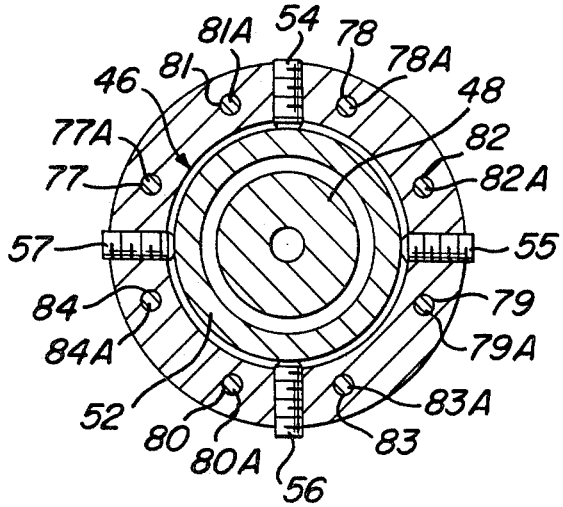
FIG. 5
FIG. 4
INVENTORS
ALKIS CHRISTOFAS
ANDREW A. DUKERT
BY *Stanley Bilker*
ATTORNEY United States Patent Office 3,583,033
Patented June 8, 1971

ABSTRACT OF THE DISCLOSURE

A die for in-line extrusion of viscoelastic and viscous thermoplastic materials. The die includes a conical male valve member which is advanced or retracted with respect to a conical seat to vary the degree of shear and back pressure to which the material is exposed in passing through the annular conical passageway. High inventory zones are disposed downstream of the spider for supporting the valve member and allows for relaxation of the material. Heat may be peripherally or centrally incorporated and air introduced for blow forming.

---

This invention relates to the extrusion of thermoplastic materials, such as polyvinylidene fluoride. More particularly, it relates to an improved system for extruding high molecular weight viscous polymers, such as polyvinylidene fluoride, at increased rates while producing homogeneous extrudates which are free of surface flaws or internal defects, fractures or dislocations. The instant invention is especially directed to a novel and improved die design for in-line extrusion of symmetrical and/or asymmetrical rods, bars, piping or tubing.

Polyvinylidene fluoride is a fluorine-containing thermoplastic resin. It is a crystalline, high molecular weight polymer of vinylidene fluoride. From its composition and structure $PVF_2$ has excellent stability to environmental stresses. Other properties derived from its stable and uniform composition are thermal stability, high impact, tensile and compression strength, low level of creep and excellent chemical resistanse to a great number of compounds which attack many of the commonly used polymeric materials.

Polyvinylidene fluoride can be fabricated into various forms, i.e., shapes, rods, tubing, pipe, wire coating and jackets, or film by using known extruding means. In all of the above extrusion applications $PVF_2$ behaves as a true thermoplastic and can be processed generally by using known extruding means and tooling.

However, vinylidene fluoride as a high molecular weight, high fluorine content polymer with a high melting point is characterized by a rather high melt viscosity at processing temperatures, highly viscoelastic properties of the melt and a rather low critical shear point. In forming $PVF_2$ by the prior are extrusion methods and tooling, especially at high throughput rates while using dies of conventional configuration, the above properties can be the cause of melt fracture and improperly converted melt and result in internal stresses affecting the strength and shape stability of the end construction, especially in environments of fluctuating or recycling high temperature.

In our prior Pat. No. 3,402,427, we described and showed a cross-head type die for extruding high molecular weight viscous polymers at high output rates. The prior patented construction introduced a valving mechanism utilizing at least two adjustable frusto-conical annular passages which were located downstream of the extruder head. The patented crosshead die design permitted adjustable streamlined flow and provided for controlled pressure drop and alternating high shear, laminar and relaxation flow zones. Extensive field tests of the crosshead design have indicated that it delivers a melt of excellent conversion together with thermal and physical homogeneity without surface defects or internal stresses at high rates of throughput.

As is well known, crosshead dies deliver the melt at right angles to the machine direction and accomplishes the result by means of an internal streamlined flow deflector. However, where it is desirable to extrude piping, tubing or rod, the use of a crosshead die requires costly and cumbersome rearrangement of machinery and auxiliary equipment. In many cases, right angle configuration of the die with the extruder is impossible and can be justified only for permanent production lines where materials dictate that such crosshead tooling is absolutely mandatory.

Nonetheless, when it is desired to utilize in-line tooling where the melt is formed in the extruder machine direction, a basic problem arises in the mode of mounting the valving system without conflicting with the streamlined laminar flow direction. That is, the mounting of an internal valving system for an in-line extrusion arrangement usually requires the use of radial spiders or webs for supporting the valve elements. Since the radial spiders and/or supporting webs for the valves act to deflect the flow of plastic material therethrough, the recombination of the material immediately behind the supporting barriers can result in fissures and hence internal and external flows. As is also evident, it is difficult to maintain temperature across the entire section of the spiders.

It is therefore an object of this invention to provide a valving mechanism for in-line extrusion of viscous thermoplastic materials which will deliver a melt of excellent conversion and thermal and physical homogeneity.

Another object of this invention is to provide an in-line valving system for extrusion of viscous thermoplastic material in which well converted melts can be delivered at higher outputs.

Still another object of this invention is to provide an in-line valve mechanism and method to produce pipe and tubing of various diameters and dimensions.

Yet another object of this invention is to provide an in-line valving method and apparatus for use with viscoelastic polymers whereby ready compensation may be made for interruptions produced by supporting webs.

Yet still another object of this invention is to provide an in-line valving mechanism for use with viscoelastic resins wherein the valving means is located upstream of the relaxation zones.

Yet a further object of this invention is to provide a valve for in-line extrusion of viscoelastic material in which adjustment of flow is accomplished with great facility.

Other objects of this invention are to provide an improved device and method of the character described which is easily and economically produced, which is sturdy in construction, and both highly efficient and effective in operation.

With the above and related objects in view, this invention consists of the details of construction and combination of parts as will be more fully understood from the following detailed description when read in conjunction with the accompanying drawings in which:

FIG. 1 is a longtiudinal sectional view of an in-line valving mechanism embodying this invention.

FIG. 2 is a sectional view taken along lines 2—2 of FIG. 1.

FIG. 3 is a sectional view taken along lines 3—3 of FIG. 1.

FIG. 4 is a sectional view taken along lines 4—4 of FIG. 3.

FIG. 5 is a sectional view taken along lines 5—5 of FIG. 1.

FIG. 6 is a fragmentary sectional view of a smaller die for incorporation with the valve mechanism.

Referring now in greater detail to the drawings in which similar reference characters refer to similar parts, we show a valving die for in-line extrusion of thermoplastic material.

The die comprises a generally cylindrical first body portion 12 which is directly coupled to the nozzle (not shown) of an extruder by means of a suitable threaded internal throat 14. A second body member 16 is axially coupled to the first body portion 12, peripheral alignment being maintained by a plurality of circumferentially spaced guide pins or dowels 18 fixed in the first body member 12 and slidable in bores 20 in the second body member. The neck portion 22 of the first body member 12 is machined to a diameter approximately .002 inch to .005 inch smaller than the inner diameter of the collar on second body member 16 so that the two members telescope with respect to each other in these areas and form a seat. The exterior surface of the first body member 12 has left hand threads 26 formed therein while the adjacent surface of second body member 16 is threaded with right hand threads 28. The two body members 12 and 16 are further connected together with an internally threaded ring 30 with spanner depression 32 for rotation with a suitable wrench. As is apparent, rotation of the ring 30 in one direction draws the two telecoping body members closer together while turning in the opposite direction urges the body members apart. It is to be observed that rotation of the nut or ring 30 changes the length of the interior cavity 34 and especially conical cavity 36, the later acting as the valve seat.

The second body member 16 includes a central mandrel 38 which is supported axially therein by spiders or webs 40. A threaded nose portion 38A on the mandrel 38 coaxially supports a conical male member 42 which projects forwardly through the conical cavity 36 and partially into cylindrical cavity 34. Thus, by rotating the ring 30, the conical male member 42 can be made to advance or retract within its complementary conical cavity or seat 36. This arrangement causes the melt from the extruder to pass into the annular conical passageway 36 defined by the relative position of the conical male member 42 with respect to its seat in the first body member 12. Since the annulus 36 is adjustable, the shear to which the melt is subjeced and correspondingly the back pressure of the die can be adjusted independently from the cross-section of the forming die.

The melt emerging from the conical annulus 36 passes through the space 44 between the radial spiders 40 and then enters the high inventory annular space 46 on the downstream side of the valve 42 and mandrel 38. The high inventory space 46 defines the relaxation zone where the viscoelastic material relaxes and recovers from the high shear imposed by the valve zone at 36 and the intrusion by the spiders 46 on the path of travel. The high inventory space 40 is formed by a rearwardly extending mandrel 48 which engages a threaded tail piece 38B on mandrel 38 and a peripheral skirt 50 which is connected to the rear of the second body portion 16.

A centering ring 52 is supported within the skirt 50 and can be radially adjusted by four symmetrically disposed screws 54, 55, 56 and 57. The interior surface of the centering ring 52 includes a pair of tapered surfaces 52A and 52B whose apex defines a constricted passage 58 with the O.D. of mandrel 48.

Attached to the rear end of the skirt 50 is an outer die member 60 which defines the O.D. of the pipe or tube P which is being extruded. Die mandrel 62 is threaded upon the rear mandrel 48 and is concentrically disposed with respect to the die 60 to define I.D. of the pipe P being extruded.

To insure uniform heat transfer at both the interior and exterior surfaces of the melt, heating cartridges and/or coils may be appropriately incorporated in the center and at the peripheral portions of the valving mechanism. For example, an electrical cartridge heater 64 may be disposed within a central bore 66 in the die mandrel 62, the bore 66 registering with and extending through the mandrels 48 and 38 and terminating finally in a blind hole 68 in the conical male member 42. Another cartridge heater 70 may be inserted within oblique hole 72 extending through mandrel 38 into the center bore 66 therein. A second blind hole 74 to which a fitting 76 is attached also extends through the body portion 10, the upper web 40 and the mandrel 38. Air or a gas may be introduced through the fitting 76 and oblique hole 74 where it is desired to form the pipe P by a process similar to blow molding. In the latter case, longitudinal grooves (not shown) machined inside the oblique hole 74, or longitudinal grooves or flats machined on the outside of the cartridge heater, or a hollow cartridge heater would allow the passage of air inside the extruded pipe.

A series of four counter bored holes 77, 78, 79, and 80 are drilled through the skirt 50 and register with tapped holes in the second body portion 16, Cap screws 77A, 78A, 79A, and 80A extend through the skirt 50 and are threaded into the tapped holes in the body portion 16 to secure the skirt thereo. Similarly, the die 60 has four circumferentially spaced holes (not shown) which register with tapped holes 81, 82, 83, and 84, in the skirt 50. The die 60 is then attached to the skirt by threading four cap screws 81A, 82A, 83A and 84A from shoulder 85 into the respective tapped holes.

In FIG. 6, there is illustrated the attachment of a die member having an orifice 160 of smaller I.D. than the die 60 and a die mandrel 162 of lesser O.D. than the die mandrel 62. The die member 160 is attached to the skirt 50, as before, by cap screws 81A and 83A being illustrated only. Similary, the die mandrel 162 is threaded upon the externally threaded tail on rear mandrel 48. In addition, there is also illustrated a circular heating band 86 which embraces the periphery of the die member 160 whereby heat can be supplied to the outer portion of the die as well as the die mandrel 162. It is to be observed that a heating coil may also be used to supply heat about the die orifice 60. Lastly, it is to be noted that the length of the land portion of the die 160–162 for extruding smaller diameter tubing is longer than the length of the land portion of die 60–62.

As is apparent from the foregoing description, the shear and back pressure of the melt is not mainly dependent upon the annulus forming the outlet of the die, but rather from the adjustment of the valve mechanism, i.e., the displacement of the conical male member 42 with respect to its conical seat 36. By rotation of the ring nut 30, the valve member 42 can be moved closer or further away from its seat thereby constricting or dilating the conical passageway 36. Therefore, a well converted melt can be delivered at higher output even. The melt is brought into relaxed condition in the high inventory zone 46 after moving past the spiders 40. Being in a relaxed condition, the melt can be drawn to very uniform constructions, including blowing to uniform walled expanded shapes by way of the introduction of air through fitting 76 and oblique hole 74.

Although this invention has been described in considerable detail, such description is intended as being illustrative rather than limiting, since the invention may be variously embodied, and the scope of the invention is to be determined as claimed.

What is claimed is:

1. A valving mechanism and die for in-line extrusion of thermoplastic material comprising a body member having a longitudinally extending axial passage therein including a short cylindrical bore adjacent the inlet end thereof for coaxial coupling to an extruder and a frusto-conical surface symmetrically diverging from said bore to define a conical valve seat within an upstream portion of the passage, a valve member having a conical surface complementary with said valve seat, a mandrel supporting said valve member, said mandrel having radially extending ribs outwardly projecting from an intermediate portion thereof for orienting said valve member concentrically with respect to said conical valve seat and said mandrel axially within said passage downstream thereof, adjusting means for longitudinally displacing said valve member with respect to the conical seat so as to vary the spacing of the annulus therebetween, a relatively large volume high inventory annular space downstream of said radially extending webs and constituting a relaxation flow zone for the thermoplastic material after being subjected to shear within the valve annulus and division by said webs, and a die coupled to the distal end of said body member and having an orifice in communication with said relaxation zone whereby the thermoplastic material will be exposed first to adjustably controlled shear and pressure in the valve annulus and then to relaxation in the high inventory space so as to deliver well-converted, thermally and physical homogeneous melts through the die at high outputs.

2. The valving mechanism of claim 1 including a mandrel coaxially extending through the high inventory annular space and through the die orifice.

3. The valving mechanism of claim 2 including means for heating said mandrel.

4. The valving mechanism of claim 2 including means to heat said die member.

5. The valving mechanism of claim 2 including a centering ring concentrically disposed with respect to said mandrel.

6. The valving mechanism of claim 5 including means for radially adjusting said centering ring in order to produce uniform wall thickness in tubing extruded through said die.

7. The valving mechanism of claim 2 including a blind bore extending into said mandrel, and means to introduce a source of gas under pressure into the blind bore upstream of said die whereby tubing extruded through the orifice thereof may be blow formed.

8. The valving mechanism of claim 2 including interchangeable dies aand mandrels for producing tubing of various outside and inside diameters.

9. The valving mechanism of claim 1 wherein said body member includes a pair of telescoping housing portions, said webs being affixed to the rearward housing portion, and said means for longitudinally displacing comprises an internally threaded ring in engagement with opposed threads at the adjacent exterior portions of said respective housing portions.

References Cited

UNITED STATES PATENTS

| | | | |
|---|---|---|---|
| 1,768,671 | 7/1930 | Devine | 18—14 |
| 3,221,371 | 12/1965 | Stevens | 18—14 |
| 3,281,896 | 11/1966 | Meyer et al. | 18—14 |
| 3,327,350 | 6/1967 | Limbach | 18—5X |
| 3,402,427 | 9/1968 | Christofas et al. | 18—13 |
| 3,497,915 | 3/1970 | Ronden | 18—14 |

FOREIGN PATENTS 208,367  2/1956  Australia.

J. SPENCER OVERHOLSER, Primary Examiner

R. L. SPICER, Jr., Assistant Examiner

U.S. Cl. X.R.

18—12DM